United States Patent
Oku

(10) Patent No.: US 8,290,372 B2
(45) Date of Patent: Oct. 16, 2012

(54) OPTICAL TRANSCEIVER, ITS COMMUNICATION METHOD, AND COMMUNICATION SYSTEM

(75) Inventor: Noriyoshi Oku, Tokyo (JP)

(73) Assignee: NEC Corporation, Tokyo (JP)

( * ) Notice: Subject to any disclaimer, the term of this patent is extended or adjusted under 35 U.S.C. 154(b) by 754 days.

(21) Appl. No.: 12/388,946

(22) Filed: Feb. 19, 2009

(65) Prior Publication Data

US 2009/0208222 A1    Aug. 20, 2009

(30) Foreign Application Priority Data

Feb. 19, 2008    (JP) .................................. 2008-037335

(51) Int. Cl.
*H04B 10/00*    (2006.01)

(52) U.S. Cl. ......... 398/135; 398/138; 398/128; 398/130
(58) Field of Classification Search ................. 398/135, 398/136, 137, 138, 139, 128, 130
See application file for complete search history.

(56) References Cited

U.S. PATENT DOCUMENTS

| 2004/0071389 A1 | 4/2004 | Hofmeister et al. |
| 2006/0093367 A1* | 5/2006 | Ekkizogly et al. .......... 398/135 |

FOREIGN PATENT DOCUMENTS

| JP | 2002334127 A | 11/2002 |
| JP | 2004222295 A | 8/2004 |
| JP | 2004247824 A | 9/2004 |
| JP | 2005535271 A | 11/2005 |
| JP | 200822116 A | 1/2008 |
| WO | 9813958 A1 | 4/1998 |
| WO | 2006096714 A | 9/2006 |

OTHER PUBLICATIONS

European Search Report for EP 09 15 3096 completed Apr. 21, 2009.
Japanese Office Action for JP2008-037335 mailed on May 18, 2012.

* cited by examiner

*Primary Examiner* — Mohammad R Sedighian

(57) ABSTRACT

An optical transceiver includes an optical transmission section that transmits an optical signal, an optical reception section that receives an optical signal, and a control section that controls the optical transmission section and the optical reception section. The control section optically communicates with an external device through the optical transmission section and the optical reception section.

12 Claims, 5 Drawing Sheets

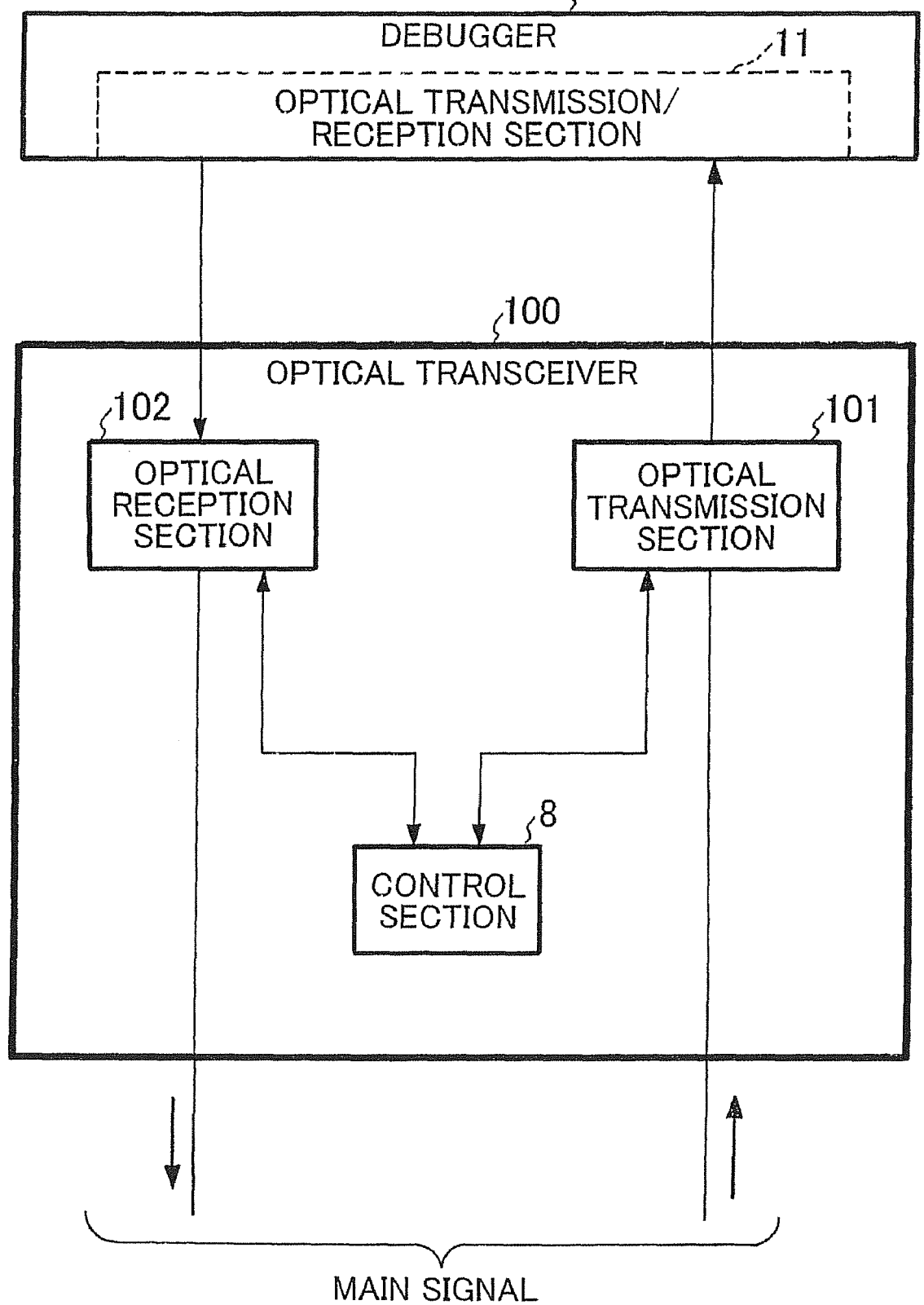

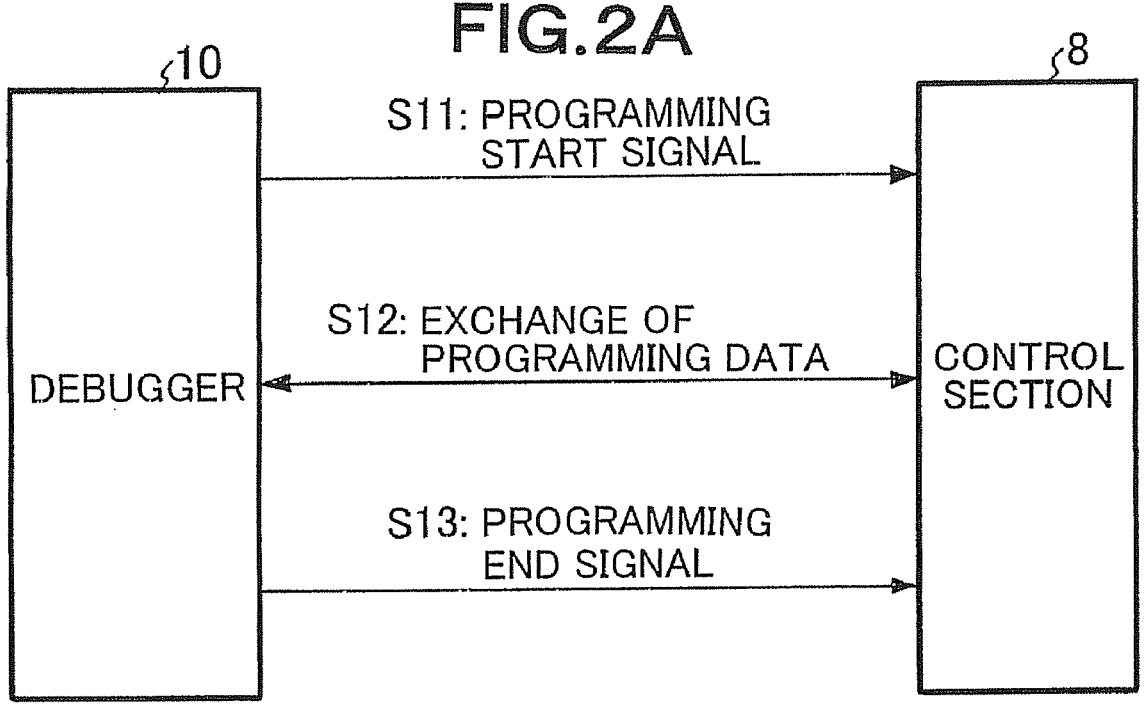
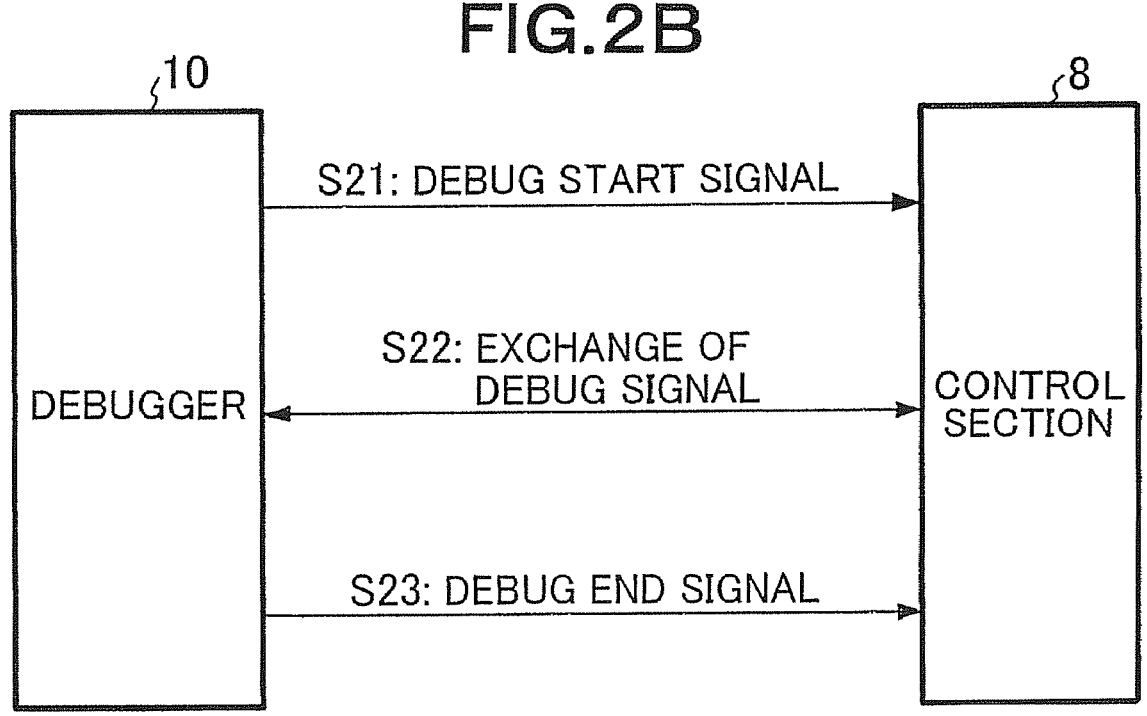

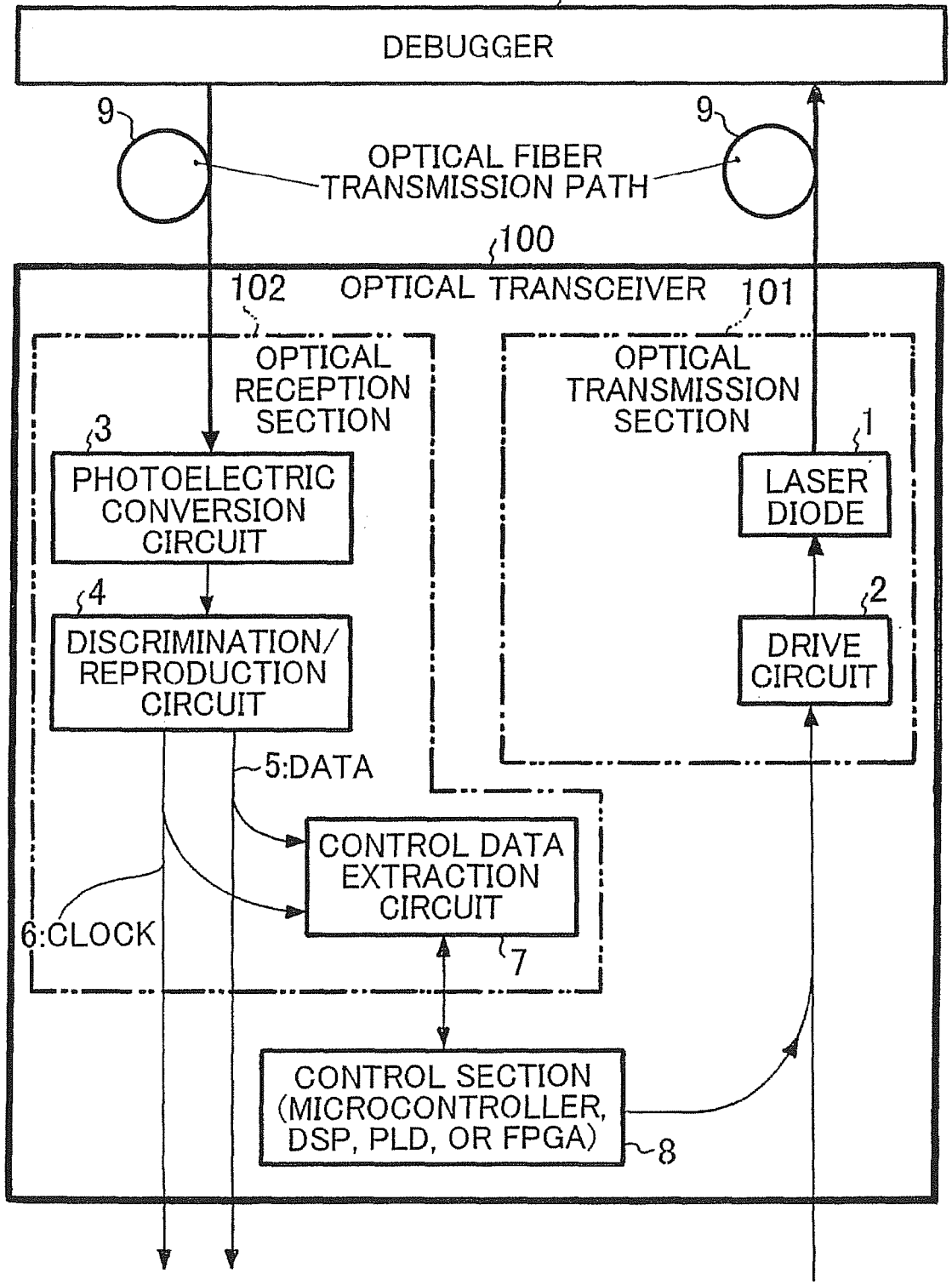

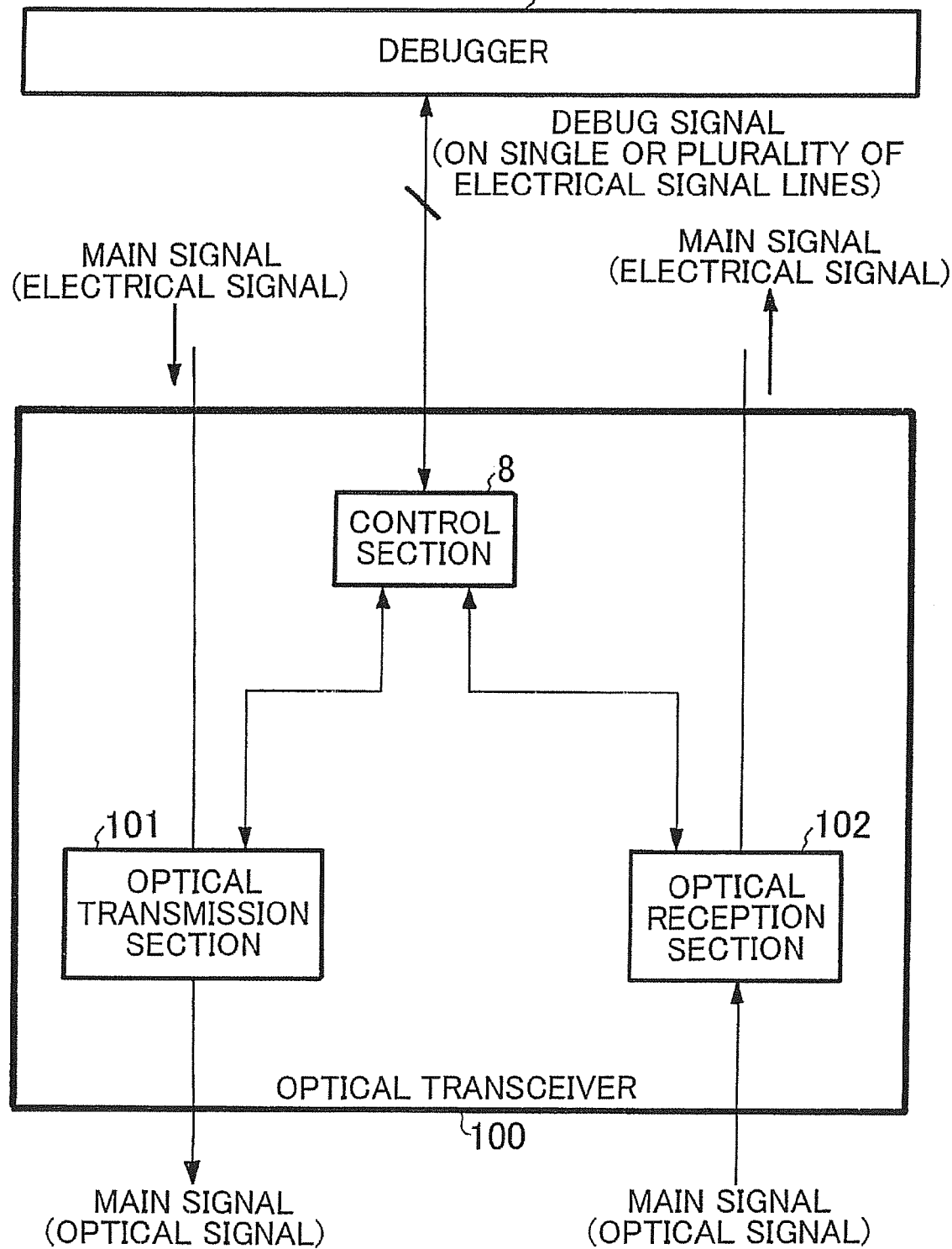

OPTICAL TRANSCEIVER, ITS COMMUNICATION METHOD, AND COMMUNICATION SYSTEM

This present application is based upon and claims the benefit of priority from Japanese patent application No. 2008-037335, filed on Feb. 19, 2008, the disclosure of which is incorporated herein in its entirety by reference.

TECHNICAL FIELD

The present invention relates to an optical transceiver and, more particularly, to an optical transceiver whose function is realized by firmware and in which in-system programming and in-system emulation of the firmware are performed.

BACKGROUND ART

With the recent progress of an optical transmitting/receiving technique, various optical transceivers have become reduced in size and become sophisticated. For example, in order to attain highly sophisticated functions, a microcontroller or a controller such as DSP (Digital Signal processor), PLD (Programmable Logic Device) or FPGA (Field Programmable Gate Array) that can perform intelligent control is increasingly being mounted in an optical transceiver, and the functions thereof are increasingly being realized by firmware.

The firmware is developed generally using "in-system programming" that allows a program to be written in a state where a controller such as microprocessor, DSP, FPGA, or PLD has been mounted on a circuit board or "in-system emulation" that debugs a program using an in-circuit emulator (ICE) or on-chip emulator. However, the size of the transceiver has become reduced, which may restrict utilization of such a function.

FIG. 5 shows a related optical transceiver. An optical transceiver 100 of FIG. 5 is constituted by an optical module that optically communicates with an external device while converting an electrical signal (main signal) to an optical signal (main signal) or converting an optical signal to an electrical signal. The optical module includes an optical transmission section (optical signal transmission function) 101 that transmits an optical signal, an optical reception section (optical signal reception function) 102 that receives an optical signal, and a control section 8 constituted by a controller such as a microprocessor, DSP, PLD, or FPGA.

A CPU, a memory (ROM or RAM), an I/O, and the like, which are not shown, are arranged in the control section 8. In the storage area of the memory, a control program (firmware) executed by the CPU is stored in a rewritable manner. The control section 8 uses the CPU to execute a command from the control program stored in the memory to thereby control operations of the optical transmission section 101 and the optical reception section 102.

A debugger 10 is used for performing the in-system emulation or in-system programming for the optical transceiver 100. The debugger 10 is connected to the control section 8 which is a debug target through a dedicated electrical terminal such as a connector by a single or plurality of electrical signal lines (a signal exchanged between the debugger 10 and the control section 8 denotes a debug signal or a programming signal). As a stand-alone device (software), the debugger 10 is configured to only debug a program. However, in this example, the debugger 10 serves also as a program loader for writing a program.

When the in-system programming or in-system emulation is performed in the configuration of FIG. 5, an electrical signal serving as a debug signal or programming signal is input from the debugger 10 to the control section 8 through the electrical signal line and dedicated electrical terminal. Thus, an electrical signal serving as a debug signal or programming signal is exchanged between the control section 8 and the debugger 10 through the electrical signal line and dedicated electrical terminal, whereby writing of firmware or debug is performed for the control section 8.

Relating to the above, JP-A-2004-222295 (Patent Document 1) discloses an optical transceiver module for optical communication having a transmitter, a receiver and a controller. In this optical transceiver module, the controller has a transceiver operation code including a plurality of task codes for controlling the optical transceiver module. Priority order is imparted to the plurality of task codes, and the controller executes the tasks according to the priority order.

Further, JP-A-2002-334127 (Patent Document 2) discloses an emulation system of built-in firmware capable of realizing emulation in a field of optical transmission amplification with high accuracy. This system has a device information table for storing externally set circuit information of a real circuit to be controlled by a built-in firmware and a data transition managing means for converting the data stored in the device information table into a relational map that associates the circuit information of the real circuit with I/O information of the built-in firmware and real circuit and performs emulation of the built-in firmware based on the relational map.

In developing firmware of a microcomputer and DSP used in a small type optical transceiver, a dedicated electrical terminal needs to be provided in order to realize the in-system programming or in-system emulation. For example, in the invention disclosed in Patent Document 2, UART (Universal Asynchronous Receiver and Transmitter) is used as a connection means for connecting an external controller and an emulation section.

In such a case, when the size of the apparatus is further reduced, a case may occur where space for the dedicated electrical terminal cannot be ensured in the apparatus. As a result, it may be impossible to use the in-system programming function or in-system emulation function, which becomes a serious obstacle to developing firmware of the apparatus.

SUMMARY OF INVENTION

An object of the present invention is to realize in-system programming function or in-system emulation function without providing a dedicated electrical terminal in an optical transceiver.

In order to attain the above object, according to the present invention, there is provided an optical transceiver including: an optical transmission section that transmits an optical signal; an optical reception section that receives an optical signal; and a control section that controls the optical transmission section and the optical reception section, wherein the control section optically communicates with an external device through the optical transmission section and the optical reception section.

According to the present invention, the control section utilizes the optical transmission section and the optical reception section that the optical transceiver originally has to optically communicates with an external device. As a result, it is possible to realize the in-system programming or in-system emulation function without providing a dedicated electrical terminal in the optical transceiver.

BRIEF DESCRIPTION OF DRAWINGS

{FIG. 1}

FIG. 1 is a block diagram showing an internal configuration of an optical transceiver according to an exemplary embodiment of the present invention.

{FIG. 2}

FIG. 2A is a flowchart for explaining a control flow of an in-system programming function, and FIG. 2B is a flowchart for explaining a control flow of an in-system emulation function.

{FIG. 3}

FIG. 3 is a block diagram showing an internal configuration of an optical transceiver according to a first example of the present invention.

FIG. 4 is a block diagram showing an internal configuration of an optical transceiver according to a second example of the present invention.

{FIG. 5}

FIG. 5 is a block diagram showing an internal configuration of an optical transceiver of a related art.

DESCRIPTION OF EMBODIMENTS

Figure 4:
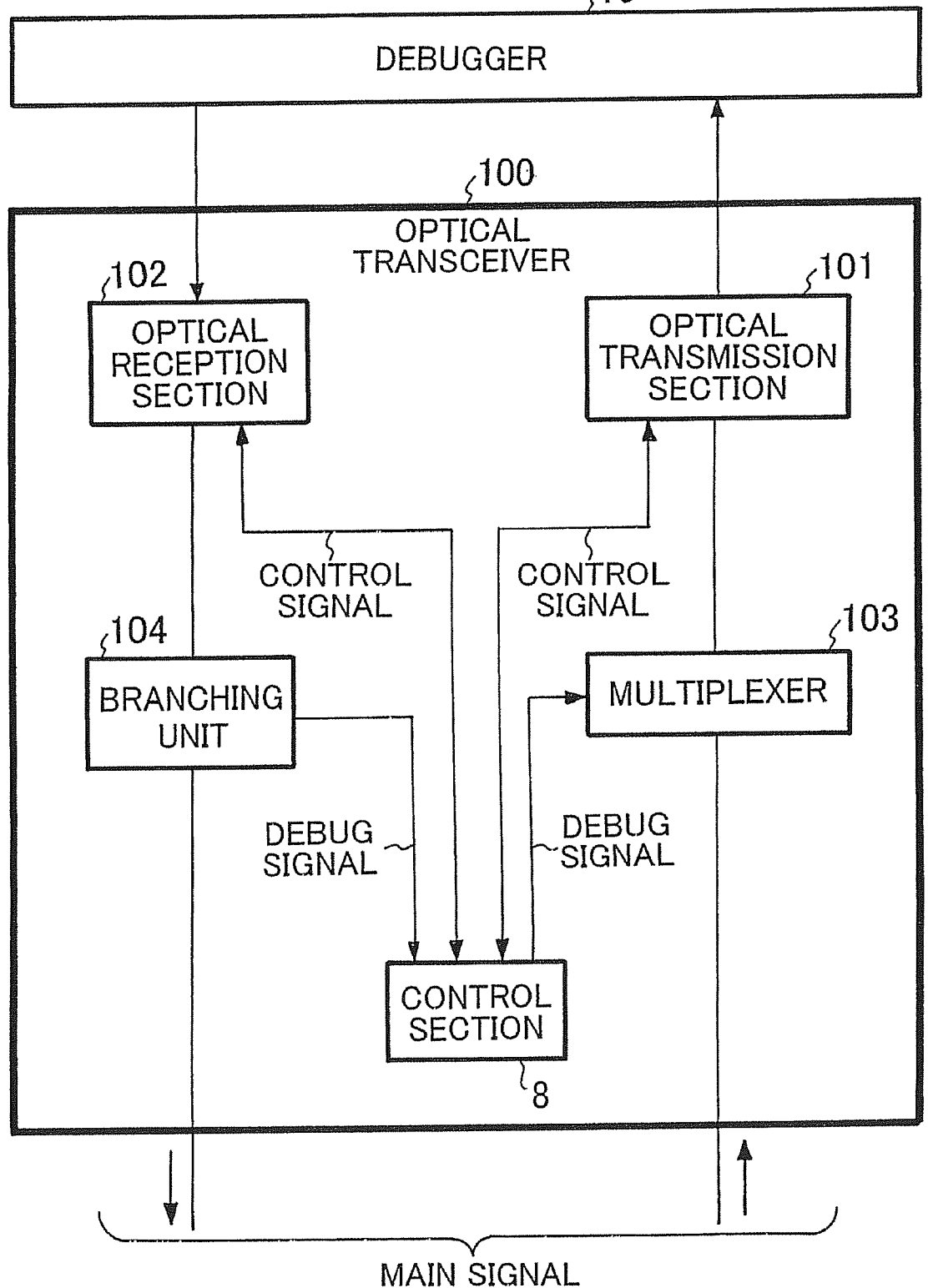
{FIG. 4}

An exemplary embodiment for practicing an optical transceiver, its communication method, and a communication system will be described in detail below with reference to the accompanying drawings.

FIG. 1 is a conceptual view showing the most basic construction of an optical transceiver according to the exemplary embodiment of the present invention. An optical transceiver 100 according to the present exemplary embodiment shown in FIG. 1 is an apparatus to be applied to an optical communication system and is constituted by an optical module. The optical module integrally includes an optical transmission section and an optical reception section and is configured to optically communicate with an external device while converting an electrical signal to an optical signal or converting an optical signal to an electrical signal. More specifically, the optical module includes an optical transmission section (optical signal transmission function, optical transmitter) 101 that converts an electrical signal (main signal) into an optical signal for transmission, an optical reception section (optical signal reception function, optical receiver) 102 that converts an optical signal (main signal) into an electrical signal for reception, and a control section 8 whose function is realized by program control.

The control section 8 is constituted by a controller such as a microprocessor, DSP, PLD, or FPGA. Components constituting the controller, such as a CPU, a memory section (ROM (Read Only memory) or RAM (Random Access Memory)), an I/O (input/output) section, and the like, which are not shown, are arranged in the control section 8. In the storage area of the memory section, a control program (firmware) executed by the CPU is stored in a rewritable manner. The control section 8 uses the CPU to execute a command from the control program stored in the memory to thereby control operation of the optical transceiver 100.

A debugger 10, which is provided as an external device of the optical transceiver 100, is used for performing in-system programming or in-system emulation for the control section 8. As a stand-alone device (software), the debugger 10 is configured to only debug a program. However, in the present exemplary embodiment, the debugger 10 serves also as a program loader for writing a program. An optical transmission/reception section (or optical transceiver) 11 is mounted on or connected to the debugger 10 as a communication device (communication interface). The optical transmission/reception section 11 includes an optical transmission section that converts an electrical signal into an optical signal for transmission and an optical reception section that converts an optical signal into an electrical signal for reception.

In the optical transceiver 100 of the related art shown in FIG. 5, an electrical signal is input thereto from the debugger 10 through a dedicated electrical terminal such as a connector and an electrical signal line to thereby perform a program update, while in the present exemplary embodiment, the optical transceiver 100 utilizes the optical transmission/reception function (optical transmission section 101 and optical reception section 102) that the optical transceiver 100 itself originally has to receive, as an input, an optical signal corresponding to a control signal from the debugger 10 through the optical transmission/reception section 11 of the debugger 10 side, whereby writing of a control program or debug is performed for the control section 8.

Thus, the optical transceiver 100 uses the optical signal transmission function and optical signal reception function that the optical transceiver 100 itself originally has to optically communicates with the debugger 10. More specifically, in the optical transceiver 100, a signal output from the control section 8 is input to the optical transmission section 101 and is then transmitted from the optical transmission section 101 to the debugger 10 as an optical signal, while an optical signal transmitted from the debugger 10 is input to the optical reception section 102 and is then input, as an electrical signal, to the control section 8 where firmware processing is performed. This configuration enables the in-system programming and in-system emulation functions in the optical transceiver 100.

FIG. 2A is a view for explaining a control sequence showing a control flow of the in-system programming function that can be realized by the optical transceiver 100. As shown in FIG. 2A, at the start time of operation of the in-system programming function, a programming start signal is transmitted from the debugger 10 to the control section 8 (step S11). With the programming start signal as a trigger, programming data is exchanged between the debugger 10 and the control section 8 (step S12). With the above operation, writing of a program based on the in-system programming function is performed for the control section 8. After that, at the time of end of the operation of the in-system programming function, a programming end signal is transmitted from the debugger 10 to the control section 8 (step S13). The programming start signal, programming data, and programming end signal may be of any types as long as they can realize the in-system programming function.

FIG. 2B is a view for explaining a control sequence showing a control flow of the in-system emulation function that can be realized by the optical transceiver 100. As shown in FIG. 2B, at the start time of operation of the in-system emulation function, a debug start signal is transmitted from the debugger 10 to the control section 8 (step S21). With the debug start signal as a trigger, a debug signal is exchanged between the debugger 10 and the control section 8 (step S22). With the above operation, debug of a program based on the in-system emulation function is performed for the control section 8. After that, at the time of end of the operation of the in-system emulation function, a debug end signal is transmitted from the debugger 10 to the control section 8 (step S23). The debug start signal, debug signal, and debug end signal may be of any types as long as they can realize the in-system emulation function.

Thus, according to the present exemplary embodiment, the optical transmitter and optical receiver that the optical transceiver 100 originally has is utilized to exchange a signal required for the in-system programming and in-system emulation as an optical signal with the debugger 10. As a result, it is possible to realize both the in-system programming and in-system emulation functions without providing a dedicated electrical terminal in the optical transceiver 100. Further, since the function that the optical transceiver 100 originally has is utilized for realization of both the in-system programming and in-system emulation functions, the dedicated terminal which has been required in the apparatus becomes unnecessary, enabling effective use of space in the apparatus.

In addition to an advantage that a terminal for electrical signal input becomes unnecessary to enable a reduction in the size of the apparatus, the following advantages are conceivable: (1) enable remote control; (2) enable to perform debug without interruption; and (3) enable to control not only for debug operation but also for operation of optical transceiver 100.

EXAMPLE 1

Next, with reference to FIG. 3, a first example of the present invention will be described.

In the optical transceiver 100 according to the first example shown in FIG. 3, reference numeral 1 denotes a laser diode and 2 denotes a drive circuit. The laser diode 1 and the drive circuit 2 constitute the optical transmission section 101. Reference numeral 3 denotes a photoelectric conversion circuit, 4 denotes a discrimination/reproduction circuit, and 7 denotes a control data extraction circuit. The photoelectric conversion circuit 3, discrimination/reproduction circuit 4, and control data extraction circuit 7 constitute the optical reception section 2. Reference numeral 8 denotes the control section (microcontroller, DSP, PLD, or FPGA) and 9 denotes an optical fiber transmission path. Further, reference numerals 5 and 6 denote flows of electrical signals (5 is a data signal, and 6 is a clock signal) transmitted from the discrimination/reproduction circuit 4 to the control data extraction circuit 7.

The drive circuit 2 modulates the laser diode 1 by means of an adequate bias current according to a signal input thereto from an external device or the control section 8. An output optical signal of the laser diode 1 is sent to the optical fiber transmission path 9 after being passed through an optical isolator and a lens optical system (which are not shown) in the optical transmission section 101 as needed and is then transmitted to the debugger 10. An optical signal is transmitted also from the debugger 10. The optical signal transmitted from the debugger 10 is input to the photoelectric conversion circuit 3 through the optical fiber transmission path 9. The optical signal that has been input to the photoelectric conversion circuit 3 is photo-electric converted there and is subjected to reproduction processing in the discrimination/reproduction circuit 4. Then, the data 5 and clock 6 are generated in and output from the discrimination/reproduction circuit 4. The data 5 and clock 6 are input to the control data extraction circuit 7 as needed. The control section 8 controls the entire operation of the optical transceiver 100 while appropriately controlling the drive circuit 2, photoelectric conversion circuit 3, discrimination/reproduction circuit 4, and control data extraction circuit 7 and obtaining information from these sections.

Operation of the first example will next be described.

In the first example, a signal from the control section 8 is transmitted to the debugger 10 through the drive circuit 2 and the laser diode 1, and an optical signal transmitted from the debugger 10 is input to the control data extraction circuit 7 through the photoelectric conversion circuit 3 and the discrimination/reproduction section 4. In this operation, information required for the in-system programming and in-system emulation is separated/extracted from the input signal. The extracted information is then input to the control section 8, thereby allowing the optical transceiver 100 to communicate with an external device.

As described above, the following advantages can be obtained in the first example.

1) In the first example, the control section 8 and the debugger 10 communicate with each other through the optical transmission section (laser diode 1 and drive circuit 2) and optical signal reception section (photoelectric conversion circuit 3, discrimination/reproduction circuit 4, and control data extraction circuit 7). This communication provides the in-system programming and in-system emulation functions, thereby eliminating the need for the optical transceiver to include a connection mechanism with the debugger 10, so that space corresponding to the connection mechanism can be saved. As a result, in terms of mounting space, restrictions on the approach to the size reduction can be eliminated.

2) As described above, in the first example, an optical signal is used for the in-system programming and in-system emulation. Therefore, by utilizing the optical fiber transmission path 9 as a transmission medium, the in-system programming and in-system emulation can remotely be controlled.

In the configuration of the first example, the discrimination/reproduction circuit 4 may be omitted. In this case, a photoelectric converted signal is directly input from the photoelectric conversion circuit 3 to the control data extraction circuit 7.

EXAMPLE 2

Next, with reference to FIG. 4, a second example of the present invention will be described.

The optical transceiver 100 shown in FIG. 4 includes, in addition to the optical transmission section 101, optical reception section 102, and control section 8, a multiplexer 103 that multiplexes a debug signal to be transmitted from the control section 8 to the debugger 10 and a main signal so as to generate a signal to be transmitted to the debugger 10 through the optical transmission section 101 and a branching unit 104 that divides a signal input thereto through the optical reception section 102 into a debug signal to be transmitted from the debugger 10 to the control section 8 and a main signal. In this example, the debug signal exchanged between the debugger 10 and the control section 8 includes a signal that the debugger 10 transmits for controlling the control section 8 and a signal that the debugger 10 receives for acquiring a state of the control section 8. A control signal is a signal that the control section 8 uses to control the optical transmission section 101 and the optical reception section 102 to an adequate operation state and is distinguished from the debug signal.

In the above configuration, a debug signal transmitted from the debugger 10 to the control section 8 is divided into a debug signal and a main signal in the branching unit 104 arranged at the rear stage of the optical reception section 102, and the debug signal after the division is transmitted to the control section 8. A signal transmitted from the control section 8 to the debugger 10 is multiplexed with a main signal component in the multiplexer 103, and the resultant signal is converted into an optical signal in the optical transmission section 101 to be transmitted to the debugger 10.

Thus, according to the second example, it is possible to obtain the same advantage as the above-mentioned exemplary embodiment. In addition, the configuration including the multiplexer and the branching unit can also be applied to the present invention, expanding the range of options in terms of design of the optical transceiver.

It is to be noted that the optical transceiver according to the present invention is not limited to the configurations of the above exemplary embodiment and Examples 1 and 2 and may have any configuration as long as it includes the optical transmission section that transmits an optical signal, the optical reception section that receives an optical signal, and control section that controls the optical transmission section and optical reception section and the optically communicates with an external device through the optical transmission section and the optical reception section.

In this case, as described in the above exemplary embodiment and Examples 1 and 2, it is preferable that the function of the control section is realized by program control, that the external device can write and debug a program used in the control section, and that the control section optically exchanges a signal required for writing and debugging of the program with the external device through the optical transmission section and the optical reception section. In particular, a configuration may be adopted in which the external device has a debugger, and the control section optically exchanges a signal required for debugging of the program therein with the debugger through the optical transmission section and the optical reception section. Alternatively, a configuration may be adopted in which the external device has a program loader, and the control section optically exchanges a signal required for writing of the program therein with the program loader through the optical transmission section and the optical reception section.

In the above configuration, the optical transmission section may have a laser diode and a drive circuit that drives the laser diode based on a signal from the control section, and the optical reception section may have a photoelectric conversion circuit and a data extraction circuit that separates/extracts a signal required for writing and debugging of the program from the signal photoelectric-converted by the photoelectric conversion circuit. The optical reception section may further have a discrimination/reproduction circuit that discriminates/reproduces the signal photoelectric-converted by the photoelectric conversion circuit so as to generate data and clock signals and outputs them to the data extraction circuit.

In the above configuration, the optical transceiver may further have a multiplexer that multiplexes a signal to be transmitted from the control section to the external device and a main signal so as to generate a signal to be transmitted to the external device through the optical transmission section and a branching unit that divides a signal input thereto through the optical reception section into a signal to be transmitted from the external device to the control section and a main signal.

In the above configuration, the optical transmission section and the optical reception section are preferably connected to the external device, respectively, through an optical fiber transmission path in an optically communicable manner.

A communication method of the optical transceiver according to the present embodiment is a communication method of the optical transceiver that includes an optical transmission section that transmits an optical signal, an optical reception section that receives an optical signal, and a control section that controls the optical transmission section and the optical reception section. Any method may be applied to the present invention as long as the control section optically communicates with an external device through the optical transmission section and the optical reception section.

In this case, a configuration may be adopted in which the function of the control section is realized by program control, the external device can write and debug a program used in the control section, and the control section optically exchanges a signal required for writing and debugging of the program with the external device through the optical transmission section and the optical reception section. In particular, a configuration may be adopted in which the external device has a debugger, and the control section optically exchanges a signal required for debugging of the program therein with the debugger through the optical transmission section and the optical reception section. Alternatively, a configuration may be adopted in which the external device has a program loader, and the control section optically exchanges a signal required for writing of the program therein with the program loader through the optical transmission section and the optical reception section.

Further, a communication system according to the present invention may have any configuration as long as it includes an optical transceiver having the above configuration.

As described above, the present invention can be applied to in-system programming and in-system emulation system that use the optical transmission section and the optical reception section of the optical transceiver and is suitably utilized for development of, e.g., an optical transceiver, a network device, or an optical transceiver module.

While the invention has been particularly shown and described with reference to the examples thereof, the invention is not limited to these examples. It will be understood by those of ordinary skill in the art that various changes in form and details may be made therein without departing from the spirit and scope of the present invention as defined by the claims.

The invention claimed is:

1. An optical transceiver comprising:
an optical transmission section that transmits an optical signal;
an optical reception section that receives an optical signal;
a control section that controls the optical transmission section and the optical reception section;
a multiplexer; and
a branching unit,
wherein:
the control section optically communicates with an external device through the optical transmission section and the optical reception section;
the multiplexer multiplexes a signal to be transmitted from the control section to the external device and a main signal to generate a signal to be transmitted to the external device through the optical transmission section; and
the branching unit divides a signal input thereto through the optical reception section into a signal to be transmitted from the external device to the control section and a main signal.

2. The optical transceiver according to claim 1, wherein the function of the control section is realized by program control,
the external device has a writing function and debugging function of a program used in the control section, and
the control section optically exchanges a signal required for writing and debugging of the program with the external device through the optical transmission section and the optical reception section.

3. The optical transceiver according to claim 2, wherein the external device has a debugger, and
the control section optically exchanges a signal required for debugging of the program with the debugger through the optical transmission section and the optical reception section.

4. The optical transceiver according to claim 2, wherein
the external device has a program loader, and
the control section optically exchanges a signal required for writing of the program with the program loader through the optical transmission section and the optical reception section.

5. The optical transceiver according to claim 2, wherein
the optical transmission section has a laser diode and a drive circuit that drives the laser diode based on a signal from the control section, and
the optical reception section has a photoelectric conversion circuit and a data extraction circuit that separates/extracts a signal required for writing and debugging of the program from the signal photoelectric-converted by the photoelectric conversion circuit.

6. The optical transceiver according to claim 5, wherein the optical reception section further has a discrimination/reproduction circuit that discriminates/reproduces the signal photoelectric-converted by the photoelectric conversion circuit so as to generate data and clock signals and outputs them to the data extraction circuit.

7. The optical transceiver according to claim 1, wherein the optical transmission section and the optical reception section are connected to the external device, respectively, through an optical fiber transmission path in an optically communicable manner.

8. A communication system comprising the optical transceiver according to claim 1.

9. A communication method of an optical transceiver that includes an optical transmission section that transmits an optical signal, an optical reception section that receives an optical signal, a control section that controls the optical transmission section and the optical reception section, a multiplexer and a branching unit, wherein:

the control section optically communicates with an external device through the optical transmission section and the optical reception section;
the multiplexer multiplexes a signal to be transmitted from the control section to the external device and a main signal to generate a signal to be transmitted to the external device through the optical transmission section; and
the branching unit divides a signal input thereto through the optical reception section into a signal to be transmitted from the external device to the control section and a main signal.

10. The communication method according to claim 9, wherein
the function of the control section is realized by program control,
the external device has a writing function and debugging function of a program used in the control section, and
the control section optically exchanges a signal required for writing and debugging of the program with the external device through the optical transmission section and the optical reception section.

11. The communication method according to claim 10, wherein
the external device has a debugger, and
the control section optically exchanges a signal required for debugging of the program with the debugger through the optical transmission section and the optical reception section.

12. The communication method according to claim 10, wherein
the external device has a program loader, and
the control section optically exchanges a signal required for writing of the program with the program loader through the optical transmission section and the optical reception section.

* * * * *